(12) United States Patent
Baudouin et al.

(10) Patent No.: US 12,538,935 B2
(45) Date of Patent: Feb. 3, 2026

(54) PROCESS FOR PRODUCING PURIFIED PAC'S AND SUGAR FROM FRUIT JUICE, AND COMPOSITIONS COMPRISING SAME

(71) Applicant: West Invest SA, Luxembourg (LU)

(72) Inventors: Stanislas Baudouin, Perigny (FR); Eric Reynaud, Luxembourg (LU)

(73) Assignee: WEST INVEST SA, Luxembourg (LU)

(*) Notice: Subject to any disclaimer, the term of this patent is extended or adjusted under 35 U.S.C. 154(b) by 1285 days.

(21) Appl. No.: 17/280,313

(22) PCT Filed: Oct. 2, 2019

(86) PCT No.: PCT/IB2019/058388
§ 371 (c)(1),
(2) Date: Mar. 26, 2021

(87) PCT Pub. No.: WO2020/070669
PCT Pub. Date: Apr. 9, 2020

(65) Prior Publication Data
US 2024/0251826 A1 Aug. 1, 2024

Related U.S. Application Data

(60) Provisional application No. 62/739,956, filed on Oct. 2, 2018.

(51) Int. Cl.
| | |
|---|---|
| *A23L 2/78* | (2006.01) |
| *A23L 2/04* | (2006.01) |
| *A23L 2/08* | (2006.01) |
| *B01D 15/18* | (2006.01) |
| *B01D 15/36* | (2006.01) |
| *B01J 39/05* | (2017.01) |

(Continued)

(52) U.S. Cl.
CPC ............ *A23L 2/78* (2013.01); *A23L 2/04* (2013.01); *A23L 2/08* (2013.01); *B01D 15/185* (2013.01); *B01D 15/362* (2013.01); *B01J 39/05* (2017.01); *B01J 39/16* (2013.01); *B01J 39/26* (2013.01)

(58) Field of Classification Search
CPC ........................................... A23L 2/78
See application file for complete search history.

(56) References Cited

U.S. PATENT DOCUMENTS

| | | | |
|---|---|---|---|
| 6,231,866 B1 * | 5/2001 | Mann | A23L 33/105 426/590 |
| 2006/0177525 A1 | 8/2006 | Takagaki et al. | |
| 2009/0093537 A1 | 4/2009 | Soulier et al. | |

(Continued)

FOREIGN PATENT DOCUMENTS

| | | | | |
|---|---|---|---|---|
| DE | 2624795 A1 | 12/1976 | | |
| WO | WO-03010339 A1 * | 2/2003 | ........... | B01D 15/362 |
| WO | 2018054904 A1 | 3/2018 | | |

OTHER PUBLICATIONS

Kouno JP-3595816-B2 Machine Translation (Year: 2004).*

(Continued)

*Primary Examiner* — Felicia C Turner
(74) *Attorney, Agent, or Firm* — CANTOR COLBURN LLP

(57) ABSTRACT

This disclosure relates to an proanthocyanidin extract, extract comprising sugars of a fruit juice processes for preparing same as well as the use of the extract or a composition thereof as food or neutraceutical composition.

15 Claims, 2 Drawing Sheets

(51) Int. Cl.
  *B01J 39/16* (2017.01)
  *B01J 39/26* (2006.01)

(56) References Cited

U.S. PATENT DOCUMENTS

| | | | |
|---|---|---|---|
| 2010/0331399 A1* | 12/2010 | Wood | A61P 9/08 |
| | | | 549/399 |
| 2011/0048413 A1 | 3/2011 | Foraci et al. | |
| 2015/0126598 A1 | 5/2015 | Sanoner et al. | |
| 2015/0313267 A1 | 11/2015 | Mantius et al. | |
| 2016/0262438 A1 | 9/2016 | Dravenstadt et al. | |
| 2018/0160705 A1* | 6/2018 | Bazinet | A61K 36/45 |

OTHER PUBLICATIONS

International Search Report and Written Opinion for International Application PCT/IB2019/058388; International Filing Date: Apr. 9, 2020; Date of Mailing: Jul. 1, 2020; 14 pages.

* cited by examiner

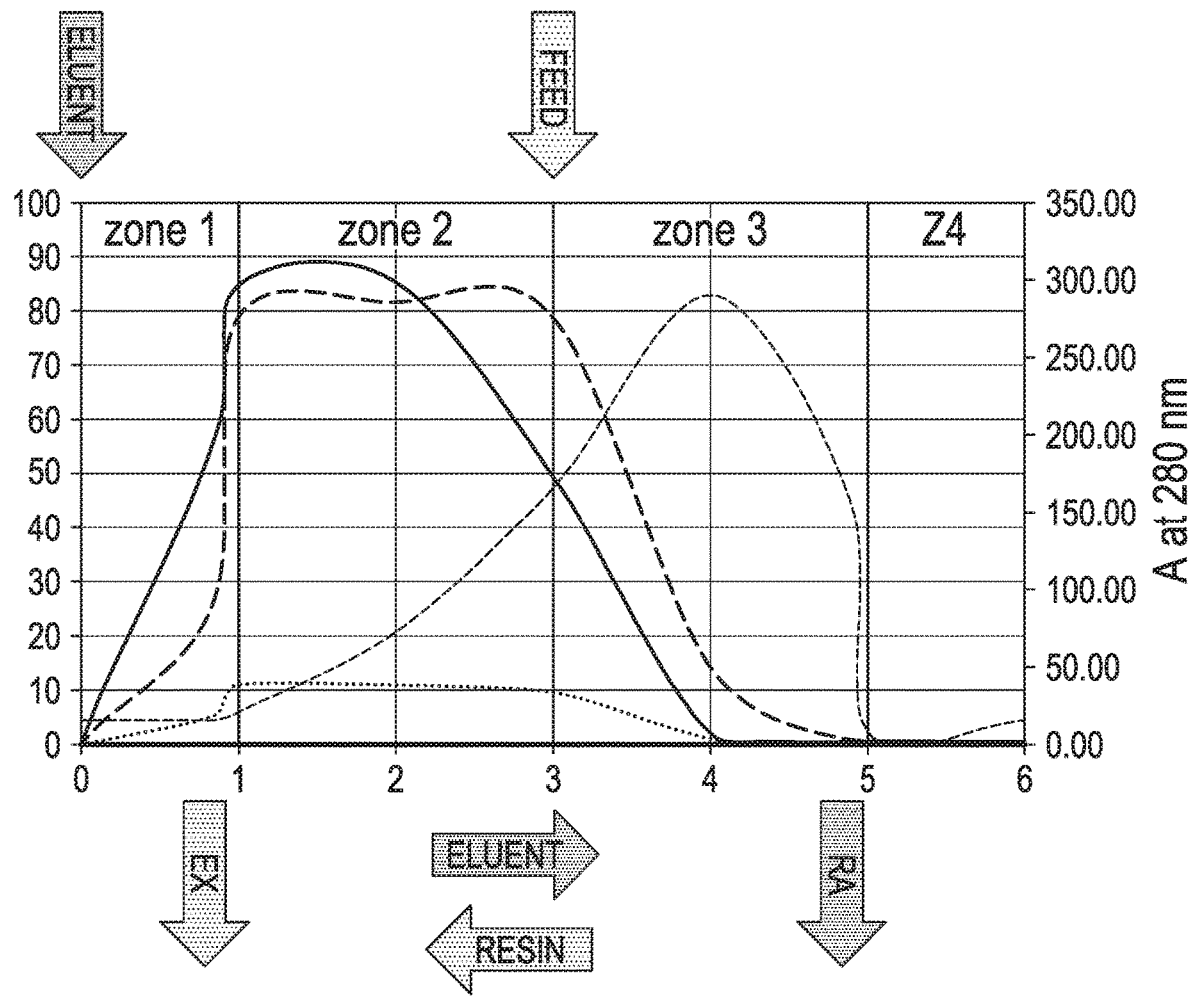

PROCESS FOR PRODUCING PURIFIED PAC'S AND SUGAR FROM FRUIT JUICE, AND COMPOSITIONS COMPRISING SAME

CROSS REFERENCE TO RELATED APPLICATIONS

This application is a National Stage application of PCT/IB2019/058388, filed Oct. 2, 2019, which claims the benefit of priority to U.S. Provisional Application 62/739,956, filed Oct. 2, 2018, both of which are incorporated by reference in their entirety herein.

BACKGROUND OF THE DISCLOSURE

Certain fruits are rich in natural sugars and bioactive components, including anthocyanins, proanthocyanidins (PACs), and other phenolic compounds.

Proanthocyanidins or condensed tannins are phenolic polymeric compounds of flavanol units, such as catechin, epicatechin and their derivatives.

Public awareness of the antioxidant and free radical-scavenging abilities of these phenolic com-pounds results largely from the potential of these compounds to increase human health in many ways. Reductions in cardiovascular disease, cerebrovascular diseases, and cancer mortality are just some of the noticeable examples associated with these phenolic compounds. Recent advances in the field of nutraceuticals have shown that the compounds found in grapes exhibit even more benefits than initially believed.

The selective capture and concentration of PACs and sugars from juices thus remains of interest in order to be able to delivering those compounds to consumers.

SUMMARY OF THE DISCLOSURE

One aspect of the disclosure relates to a proanthocyanidin extract or a composition thereof as described herein.

A further aspect of the disclosure relates to an extract comprising sugars of a fruit juice.

A further aspect relates to a process for producing a proanthocyanidin extract as described herein.

A further aspect relates to a process for producing an extract comprising sugars of a fruit juice as described herein.

A further aspect relates to the use of the proanthocyanidin extract or a composition thereof as described herein as food or neutraceutical composition.

A food or neutraceutical composition comprising the proanthocyanidin extract as described herein.

A food or neutraceutical composition comprising the extract comprising sugars of a fruit juice as described herein.

DESCRIPTION OF THE DRAWINGS

FIG. 2 illustrates the positioning of the species in the separator under SSMB for cranberry and pomegranate juices.

DETAILED DISCLOSURE

Figure 1:
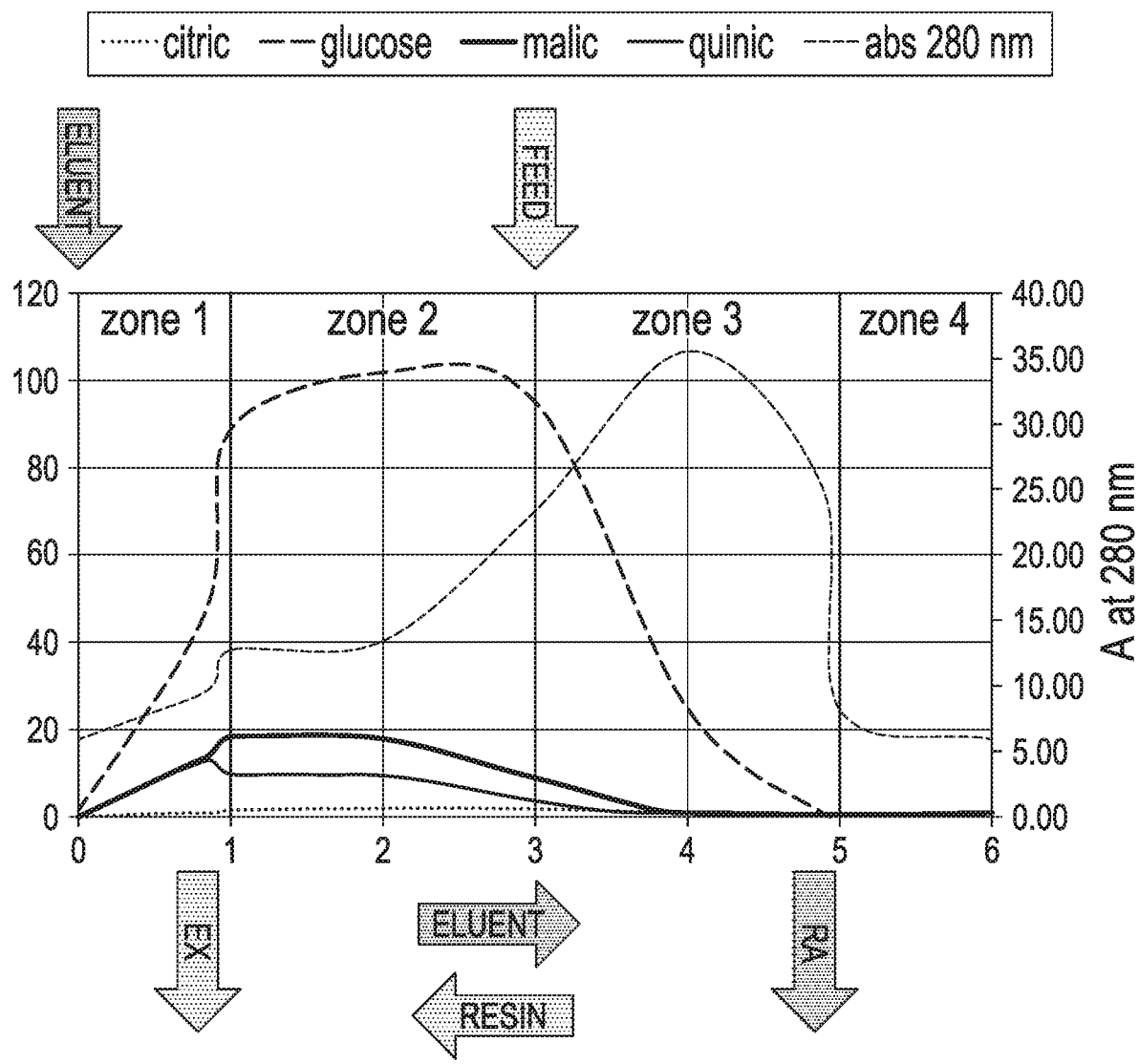
FIG. 1 illustrates the positioning of the species in the separator under SSMB for cranberry juices.

The inventors have surprisingly found that water can be used as the sole mobile phase in a process to extract PACs from aqueous solutions comprising proanthocyanidins. The process herein therefore surprisingly allows to avoid the downsides of using costly and toxic organic solvents.

In one embodiment, there is provided a process for producing a proanthocyanidin extract comprising eluting an aqueous solution comprising said proanthocyanidins on a strong cation exchange resin using a mobile phase which is consisting of water, and wherein fractions comprising said proanthocyanidins are recovered to provide said proanthocyanidin extract.

In one embodiment, there is provided a process for producing an extract comprising sugars of a fruit juice (and optionally some small organic molecules, like organic acids), the process comprising the step of eluting said fruit juice (or deacidified fruit juice and/or concentrated fruit juice) on a strong cation exchange resin using a mobile phase which is consisting of water.

In one embodiment, the aqueous solution comprising proanthocyanidins is a fruit juice.

In one embodiment, the fruit juice is comprising from about 5 et 60% (or preferably 30 et 60%) wt/wt of proanthocyanidins on dry matter basis.

In one embodiment, the fruit juice is juice from Cranberry (*Vaccinum Macrocarpon*), blue honeysuckle (Family: honeysuckle), Pomegranate (*Malum granatum*), Blackcurrant (Family: Grossulariaceae), Redcurrant (*Ribes rubrum* & gooseberries redcurrant Maquerau *Rustica*), Blueberry (*Vaccinum* & *Myrtillus*), Blackberry (Meuron/*Rubus*), Strawberry (Fragaria—Family: Rosaceae & Fragaria *Vesca* & Fragaria *Virginiana*), Raspberry (*Rubus Idaeus*), Acai (*Euterpe oleracea*), Acerola (Caraibe cherry), Goji berry (*Lycium* barbarum or *chinense* Family: Solanaceae), Cynorhodon (fruit of *Rosa canina*), Arbutus (*Arbutus unedo* Family: Ericaceae), Myrtle (Myrtus *communis* Family: Myrtaceae), Guarana (Paullinia cupana), Coffee berry (*Coffea*), Cola nuts (Cola *Nitida* or *Acuminata* Family: Sterculiaceae) or the fruit from plum tree of Japan (*Prunus* Mume (apricot hybrid—plum) and *Prunus* Salicina (plum tree)).

In one embodiment, the fruit juice is from a fruit/juice having a Total Oxygen Radical Absorbance (Total ORAC) of 2500 to 30000 and more. ORAC values can be measured and are recorded as described in USDA Database for the Oxygen Radical Absorbance Capacity (ORAC) of Selected Foods, Release 2 (May 2010), U.S. Department of Agriculture or at www.orac-info-portal.de/download/ORAC_R2.pdf and this reference is incorporated herein by reference.

In one embodiment, the fruit juice is a juice having a pH ranging from 2 to 10, preferably, from 2 to 5 and preferably of 4.5 and less, or more preferably from about 2 to 5 or from 2 to 4.5.

The fruit juice as used herein may be deacidified (according to the process defined in WO 2018/054904, incorporated herein by reference) or not, and concentrated or not, for example having a concentration index that may be comprised between 5 and 65 degrees Brix, and for example around 50 Brix.

In one embodiment, the resin is a strong cation exchange resin (i.e. comprising positively-charged ions (cations)).

In one embodiment, the resin is a styrenic resin functionalized by sulfonic acid groups.

In one embodiment, the resin has an exchange capacity of from about 1.5 to 2.2 eq/l, preferably from about 1.5 et 1.8 eq/l.

In one embodiment, the resin has a humidity content of from about 50 et 60% as $Na^+$ salt, preferably from about 55 et 60%.

In one embodiment, the resin has a uniformity coefficient (hereinafter abbreviated "UC", where UC=d60/d10: diameter for 60% of the mass of the beads/diameter for 10% of the mass of the beads) of less than about 1.2, or preferably less than about 1.1.

In one embodiment, the resin has a mean size of from about 100 et 400 μm and preferably from about 200 et 350 μm.

Without limitation, examples of commercially available strong cation exchange resins include DOWEX™ 99/350, DOWEX™ 99/320, DOWEX™ 99/310, DOWEX™ 99/280, DOWEX™ 99/220, Rohm & Haas CR1320, Rohm & Haas CR1310, Lanxess MDS 1368, Finex CS13CG, Finex CS12CG, CS11CG, DIAION™ UBK530, DIAION™ UBK510, DIAION™ UBK550, and PUROLITE™ PCR642.

Without being bound to theory, it is believed that the surprising results of the process herein may involve two types of interactions of the components comprised in the aqueous solution comprising the proanthocyanidins on the resins:
i) size exclusion according to which larger molecules fail to enter the resin pores, whereas smaller molecules diffuse in the resin, are retained and then washed by water as the mobile phase;
ii) un-dissociated organic acids are retained on the resin by hydrogen bonding.

The result is that sugars and other small molecules (as well as organic acids), having a molecular weight (MW) below about 300 Da, comprised in the aqueous solution comprising the proanthocyanidins are retained by the resin and proanthocyanidins, which are molecules having a MW of 400 Da and higher, are excluded. The continuous elution of the mobile phase (water) will cause the retained compounds to eventually be released from the resin.

In one embodiment, the process is further comprising the step of recovering, separately from said proanthocyanidins, at least one of sugars and/or other small molecules (as well as organic acids), having a molecular weight (MW) below about 300 Da from said aqueous solutions comprising proanthocyanidins.

In one embodiment, the process is providing an increased sweetening factor of said extract comprising sugars of a fruit juice, according to the following equation:

[total sugar of sugar fraction (g/l)/proanthocyanidyn of sugar fraction (g/l)]/[total sugar of feed (g/l)/proanthocyanidyn of feed (g/l)]=greater than 1; at least about 5 (±about 10%), at least about 10 (±about 10%), preferably at least about 20 (±about 10%), or at least about 20 (±about 10%), or at least about 50 (±about 10%).

This disclosure therefore provides a process for producing an extract comprising sugars from a fruit juice (and optionally some small organic molecules, like organic acids), the process comprising the step of eluting said fruit juice (or deacidified fruit juice and/or concentrated fruit juice) on a strong cation exchange resin using a mobile phase which is consisting of water. The sugars are preferably fructose, glucose or a mixture thereof.

In one embodiment, the fruit juice is comprising proanthocyanidins.

In one embodiment, the sugar extract has a pH substantially the same (i.e. ±5-10%) as that of the fruit juice (or deacidified fruit juice and/or concentrated fruit juice) and has a pH ranging from 2 to 10, preferably, from 2 to 5.

In one embodiment, the sugar extract has a pH substantially the same (i.e. ±5-10%) as that of the fruit juice (or deacidified fruit juice and/or concentrated fruit juice) has a Brix index ranging from 5 to 65 degrees Brix, and preferably has a pH ranging from 2 to 10, preferably, from 2 to 5.

In one embodiment, the sugar extract has a ratio: Total sugars (in g/l)/Proanthocyanidyn (in g/l)=at least 400, at least 1000, at least 5000, preferably at least 7000, preferably at least 8000, or preferably at least 10000.

The process (and the resins are selected so that) the fruit sugars and small molecules (as well as organic acids), for examples having a molecular weight (MW) below about 300 Da, are retained on the resin and the proanthocyanidins (having a MW of 400 Da and higher), are excluded.

Preferably said aqueous solutions comprising proanthocyanidins is a fruit juice.

The process herein is conducted without any organic solvent (or a combination thereof) as mobile phase (i.e. the mobile phase is consisting of water) for the elution. Typical solvents used in the prior art include alcohol, such as ethanol, methanol, ethyl acetate and acetone.

In one embodiment, the process comprises a step of pretreatment to clarify the juice to be used. This clarification may be done by any existing technique which is fully within the reach of one skilled in the art. Examples of these clarification techniques include centrifugation and filtration (in particular membrane, diatom or plate filtration). of the juice. In one embodiment, the juice is filtered juice comprising substantially no particle greater than 10 microns. This pretreatment step has the advantage of preventing clogging of the column.

No organic solvent is contemplated to be used (such as liquid/liquid extraction) prior to conducting the process which ensures that the fruit juice is not exposed to an organic solvent.

The proanthocyanidins obtained in accordance with the process defined herein (i.e. as an aqueous solution) may be evaporated or be partially evaporated (or concentrated), at a higher Brix degrees, such as 5 to 65 Brix or about 50 Brix) and/or be directly added to food or beverages. The proanthocyanidins solution may alternatively be dried (ex. by freeze-drying) to obtain dry proanthocyanidins composition.

In one embodiment, the PACS extract has a ratio of [(Abs.@ 280 nm (PACs)/sugar for anthocyanidin fraction)/(Abs.@ 280 nm (PACs)/sugar for Feed)] (±about 10%)=at least about 5, preferably at least about 10, or at least about 20.

The present invention also relates to a food composition that comprises proanthocyanidins as prepared herein, for example as solution or dry proanthocyanidins composition.

EXAMPLES

Example 1: Chromatography (SMB)

Simulated Moving Bed (SMB) is a well-known application in the agrochemical art (especially useful for separating sugars, organic acids and other compounds). In summary, an SMB is a counter-current chromatography system. The pumps and inlets valves are regularly shifted based on step time one column forward simulating a resin backflow. The columns distribution between inlets and outlets is constant whatever the step. After 4 steps, the system has accomplished a revolution or a cycle.

Resin

In the following example, the resin is a strong cationic polystyrene-based resin having the following features:

TABLE 1

| Resin | Dow 99 220 |
|---|---|
| Structure | Polystyrene gel |
| Capacity | 1.8 |
| Size | 220 um |
| CU | 60% D/10% D = 1.1 |

Analytical Methods

A. Determination of Dry Matter by Refractometry

The dry matter of juices is estimated by measuring the brix degree on a sucrose scale.

B. Determination of Organic Acids

The organic acids are measured by HPLC:

Column: BIORAD HPX87H 7.8*300 mm

Eluent: 3 MM $H_2SO_4$ at 1 ml/min, 60° C.

The acids are dosed in accordance with a calibration curve established at concentrations of 0.1, 0.5, 1 ans 1.5 g/l.

C. Determination of Total Polyphenols

Absorbance is measured at 280 nm which is proportional to the concentration of carbon double bonds, which are specific for polyphenols. This absorbance is considered proportional to the concentration of proanthocyanidyns in our raw material.

C. Determination of Total Sugars

The determination sugars (glucose and fructose) is by HPLC method with an Aminex HPX87K column, eluent $KH_2PO_4$ 0.13 g/l and refractometric detector. Calibration of glucose and fructose in 4 concentration points+0.

Various cranberry juice compositions were tested as summarized in Table 2.

TABLE 2

| Juice | Unit | Cranberry (1) | Cranberry (2) | Cranberry (3) |
|---|---|---|---|---|
| Brix | % | 50 | 50 | 50 |
| pH | | 2.3 | 3.3 | 3.35 |
| Absorbance (280 nm) | od | 171 | 157 | 262 |
| Proantocyanidins* | g/l | 0.954 | 0.887 | 1.48 |
| Citric acid** | g/l | 103.4 | 121.9 | 31.4 |
| Malic acid** | g/l | 117.4 | 135.8 | 83.1 |
| Quinic acid | g/l | 83.9 | 77.8 | 83.9 |
| Total sugar | g/l | 310 | 279 | 415.6 |

(1) Raw juice (with neutralization or acid removal treatment)
(2) pH adjusted with NaOH at 3.3
(3) Prepared in accordance with the process described in Reynaud et al WO 2018/054904 which is incorporated herein by reference.
*estimate from absorbance at 280 nm
**total concentration of acids and their corresponding salts The process was conducted with the following equipment:
Column: 25*1000 mm double-shell glass and adjustable piston with sintered glass of 100 μm porosity;
Circulating water bath for maintaining the temperature;
Peristaltic pump;
Automatic sampler Loading the Column The loading of the column is carried out on the material previously heated to the temperature of the test. The column is filled with water, then the resin is injected as a suspension in water. The resin level is adjusted after circulating water at the test temperature and flow rate for 30 minutes.

Packaging of the Resin

The resin is conditioned by injecting 1 N sulfuric acid, 3 BVs or 200% of the total capacity of the resin.

Packaging of the Column

The column must be balanced with the product before performing the tests. 5 BVs of the solution to be loaded is injected to stabilize the column, then that is rinsed. The pistons are adjusted to eliminate the dead volume of the column.

The above juices from table 1 are eluted in the column and the results are summarized in Table 3.

TABLE 3

| | | Juice | | | | | | | | |
|---|---|---|---|---|---|---|---|---|---|---|
| | | Cranberry (1) | | | Cranberry (2) | | | Cranberry (3) | | |
| | Unit | Feed | Anthoc Fraction | Acid/ sugar Fraction | Feed | Anthoc Fraction | Acid/ sugar Fraction | Feed | Anthoc Fraction | Acid/ sugar Fraction |
| Brix | % | 50 | | | 50 | | | 50 | | |
| pH | | 2.3 | | | 3.3 | | | 3.35 | | |
| Abs. 280 nm | od | 171 | 16.20 | 4.30 | 157.0 | 11.60 | 4.67 | 262.0 | 16.00 | 5.20 |
| Proanthocyanidyn | g/l | 0.954 | 0.09 | 0.02 | 0.88 | 0.06 | 0.03 | 1.48 | 0.09 | 0.03 |
| Purity (g/100 g)* | % | 0.19% | 24.17% | 0.07% | 0.18% | 15.94% | 0.10% | 0.25% | 33.18% | 0.10% |
| Citric acid | g/l | 103.4 | 0.772 | 7.198 | 121.9 | 0.802 | 5.803 | 31.4 | 0.084 | 0.426 |
| Malic acid | g/l | 117.4 | 0.049 | 14.617 | 135.8 | 0.051 | 9.742 | 83.1 | 0.066 | 9.827 |
| Quinic acid | g/l | 83.9 | 0.073 | 6.866 | 77.8 | 0.081 | 5.39 | 83.9 | 0.083 | 6.141 |
| Total Sugar | g/l | 310 | 0.252 | 12.288 | 279 | 0.274 | 11.057 | 415.6 | 0.12 | 12.239 |
| (Abs.@ 280 nm/sugar) | | 171/ 310 = 0.55 | 16.20/ 0.252 = 64 | Sugar/ proanth Ratio = 1.9** | 157.0/ 135.8 = 1.16 | 11.60/ 0.274 = 42 | Sugar/ proanth Ratio = 2.4** | 262.0/ 83.1 = 3.15 | 16.00/ 0.12 = 133 | Sugar/ proanth Ratio = 7** |
| | | (Abs.@ 280 nm/sugar for anthocyanidin fraction)/ (Abs.@ 280 nm/sugar for Feed) = 116 | | | (Abs.@ 280 nm/sugar for anthocyanidin fraction)/ (Abs.@ 280 nm/sugar for Feed) = 36 | | | (Abs.@ 280 nm/sugar for anthocyanidin fraction)/ (Abs.@ 280 nm/sugar for Feed) = 42 | | |

*On a dry matter basis, measured with an IR balance.
**[total sugar of sugar fraction (g/l)/proanthocyanidyn of sugar fraction (g/l)]/[total sugar of feed (g/l)/proanthocyanidyn of feed (g/l)]

It is noted that despite the fact that the feed products had an average proanthocyanidin content of about 0.2% of the measured species, the separation between anthocyanins and the rest of the cranberry juice material worked on the three types of cranberry juices tested. The anthocyanin fractions recovered reached purities of 15.9 to 33.2%, and the sugar/acid fraction only contains 0.07 to 0.1% of anthocyanins.

Example 2: SSMB

The SSMB process (described below) was developed in the 1990's to improve SMB performances, its main improvement from SMB being that the SMB Step is divided in sub-steps for more injection and recovery precision. Less peak dispersion is thus obtained by having discontinuous injection and recovery flows. SSMB is also a well known application in the agrochemical art.

Sequential of the SSMB

A period is defined as the sequence of the following 3 substeps (and with reference to FIGS. 1 and 2):
- displacement of the product towards the following column in a closed loop;
- injection of the eluent in zone 1 to recover the raffinate (RA) in zone 3;
- then, in parallel, injection of the feed in zone 3 to recover the second raffinate fraction and injection of the eluent in zone 1 to recover the extract (EX).

A period is constituted by the sequence of the adjacent steps. At the end of each step, the injection and recovery points shift of 1/ith of revolution (i being the number of columns of the separator) and the sequence repeat itself again. When i periods have been carried out, the system has done a complete cycle. Usually, 5 to 6 cycles are needed to stabilize the system.

Resin

The resin used for the tests is DOWEX 99 Ca 220 equilibrated in 0.5 mol/l sulfuric acid.

Two juice compositions were tested as summarized in Table 5.

TABLE 5

| Juice | Cranberry (3) | Pomegranate (3) | Unit |
|---|---|---|---|
| Brix | 28.9 | 22.3 | °B |
| pH | 3.34 | 4.25 | |
| Citric acid** | 3.8 | 18.3 | g/l |
| Quinic acid | 44.9 | — | g/l |
| Malic acid** | 45.1 | 0.0 | g/l |
| Glucose | 166.0 | 90.0 | g/l |
| Fructose | — | 176.7 | g/l |
| Absorbance at 280 nm | 150.8 | 395 | UA |

(3) Prepared in accordance with the process described in *Reynaud* et al WO 2018/054904 which is incorporated herein by reference. Further, the juices have been concentrated by reverse osmosis.
**total concentration of acids and their corresponding salts Analytical Methods The analytical methods in the following examples are as described in the previous example above.

Set Up of SSMB

The system consists of an automaton, a separator, consisting of 6 thermostable double-jacketed glass columns with a maximum height of 110 cm and a real internal diameter of 2.66 cm (555 ml resin/m), 6 magnetically driven pumps 0-400 ml (up to 4 inflow+2 boost pumps), a solenoid valve matrix coupled to proportional solenoid valves, allowing switching liquids in the columns and regulating separator outlet pressures and 0-10 bar pressure sensors. Each column is filled with a chromatography resin stabilized with a 0.5 mol/l sulfuric acid solution.

Results for Cranberry Juice

The results are summarized in Table 4.

TABLE 4

| | | cranberry juice (3) | | |
|---|---|---|---|---|
| Juice | Unit | Feed | Anthoc Fraction | Acid/sugar Fraction |
| Brix | % | 28.9 | 16.5 | 59.9 |
| pH | | 3.34 | 3.63 | 3.23 |
| Abs. 280 nm | od | 150.8 | 400 | 10.28 |
| Proanthocyanidyn | g/l | 0.838 | 2.222 | 0.057 |
| Citric acid | g/l | 3.8 | 3.4 | 0.7 |
| Malic acid | g/l | 45.1 | 4.1 | 127.8 |
| Quinic acid | g/l | 44.9 | 127.2 | 1.4 |
| Total Sugar | g/l | 259.8 | 37.8 | 656.3 |
| (Abs. @ 280 nm/sugar) | | 150.8/259.8 = 0.58 | 400/37.8 = 10.58 | Total sugars/Proanthocyanidyn:: 11514 |

(Abs. @, 280 nm/sugar for anthocyanidin fraction)/(Abs. @, 280 nm/sugar for Feed) = 18

FIG. 1 illustrates the positioning of the species in the separator. The juice to be subjected to separation is injected in zone 3. The anthocyanids (Abs at 280 nm) have less affinity than organic acids and sugars for the resin and are driven by the eluent (water) to zone 3 to be eluted in the raffinate (RA). Some of the anthocyanids adsorb in zone 4 (buffer zone) and are recycled by the countercurrent of resin to zone 3. The organic acids and sugars have more affinity for the resin and are driven to zone 2. Zone 1 is pure in organic acids and the countercurrent of eluent makes it possible to elute them in the extract (EX).

Results for Pomegranate Juice

FIG. 2 illustrates a similar system as above but with pomegranate juice which does not contain quinic acid. The anthocyanid/acid ratio is higher. This results in greater anthocyanin purity in zone 3. The species generally maintain the same behavior as with cranberry juice.

| | | pomegranate juice (3) | | |
|---|---|---|---|---|
| Juice | Unit | Feed | Anthoc Fraction | Acid/sugar Fraction |
| Brix | % | 22.3 | 20 | 55.1 |
| pH | | 4.25 | 4.7 | 4.1 |
| Abs. 280 nm | od | 395 | 3008 | 16.44 |
| Proanthocyanidyn | g/l | 2.194 | 16.711 | 0.091 |
| Citric acid | g/l | 18.3 | 6.8 | 50 |
| Malic acid | g/l | 0 | 0 | 0 |
| Quinic acid | g/l | | | |
| Total Sugar | g/l | 251.4 | 32 | 761.7 |
| (Abs. @ 280 nm/sugar) | | 395/251.4 = 1.57 | 3008/32 = 94 | Total sugars/Proanthocyanidyn: 8370: |

(Abs. @ 280 nm/sugar for anthocyanidin fraction)/(Abs. @ 280 nm/sugar for Feed) = 60

The invention claimed is:

1. A process for producing an extract comprising sugars and proanthocyanidin of a fruit juice, the process comprising eluting said fruit juice on a cation exchange styrenic resin functionalized by sulfonic acid groups, using a continuous mobile phase consisting of water, and recovering separate fractions including a first fraction and a second fraction from the continuous mobile phase, said separate fractions comprising the first fraction of said proanthocyanidin of said fruit juice and the second fraction of said fruit juice thereby providing said extract comprising sugars and proanthocyanidin.

2. The process of claim 1, wherein said fruit juice comprises from about 5 to 60% wt/wt of proanthocyanidins on dry matter basis.

3. The process of claim 1, wherein said juice is juice from Cranberry, blue honeysuckle, Pomegranate, Blackcurrant, Redcurrant, Blueberry, Blackberry, Strawberry, Raspberry, Acai, Acerola, Goji berry, Cynorhodon, Arbutus, Myrtle, Guarana, Coffee berry, or Cola nuts.

4. The process of claim 1, wherein said fruit juice is from a fruit and/or juice having an Oxygen Radical Absorbance Capacity (ORAC) of at least 2500.

5. The process of claim 1, wherein said fruit juice is a juice having a pH ranging from 2 to 10.

6. The process of claim 1, wherein said fruit juice is deacidified to produce a deacidified fruit juice before said eluting the deacidified fruit juice on said cation exchange styrenic resin.

7. The process of claim 1, wherein said fruit juice or said deacidified fruit juice is concentrated before said step of eluting the fruit juice or the deacidified fruit juice on said cation exchange styrenic resin.

8. The process of claim 1, wherein said fruit juice or deacidified fruit juice has a Brix index ranging from 5 to 65 degrees Brix.

9. The process of claim 1, wherein said resin has an exchange capacity of from about 1.5 to 2.2 eq/l.

10. The process of claim 1, wherein said resin has a uniformity coefficient (UC) of less than about 1.2.

11. The process of claim 1, wherein said resin has a mean size of from about 100 to 400 μm.

12. The process of claim 1, further comprising a step of recovering small molecules having a molecular weight (MW) below about 300 Da from said fruit juice comprising proanthocyanidins.

13. The process of claim 1, further comprising a step of pre-treatment to clarify said fruit juice.

14. The process of claim 1, further comprising concentrating or drying said proanthocyanidin extract.

15. The process of claim 1, providing a ratio of [(Abs. @ 280 nm (PACs)/sugar for anthocyanidin fraction)]/[(Abs.@ 280 nm (PACs)/sugar for Feed)]]=at least about 5 (+about 10%).

* * * * *